(12) United States Patent
Zlotnick

(10) Patent No.: US 9,215,955 B1
(45) Date of Patent: Dec. 22, 2015

(54) KITCHEN UTENSIL FOR LIFTING FOODSTUFFS OUT OF A CONTAINER

(71) Applicant: Gregory Zlotnick, Mansfield Center, CT (US)

(72) Inventor: Gregory Zlotnick, Mansfield Center, CT (US)

( * ) Notice: Subject to any disclaimer, the term of this patent is extended or adjusted under 35 U.S.C. 154(b) by 0 days.

(21) Appl. No.: 14/622,892

(22) Filed: Feb. 15, 2015

(51) Int. Cl.
*A47J 43/00* (2006.01)
*A47J 43/28* (2006.01)

(52) U.S. Cl.
CPC .................. *A47J 43/283* (2013.01)

(58) Field of Classification Search
CPC ......... A47J 43/283; A47J 43/18; A47J 45/10; A01K 97/14; E01H 2001/1233
USPC .................... 294/26, 61, 175, 19.3
See application file for complete search history.

(56) References Cited

U.S. PATENT DOCUMENTS

| | | | |
|---|---|---|---|
| 130,923 A | 8/1872 | Lawrence | |
| 481,691 A | 8/1892 | Currie, Jr. | |
| 880,807 A | 3/1908 | Menkin | |
| 1,202,120 A * | 10/1916 | Stuckel | B65G 7/12 294/26 |
| 1,245,216 A * | 11/1917 | Gohlke | B65G 7/12 294/26 |
| 1,275,504 A | 8/1918 | Unsinger | |
| 1,311,618 A | 7/1919 | Penn | |
| 1,339,257 A * | 5/1920 | Callahan | A45B 3/00 135/66 |
| 1,555,605 A * | 9/1925 | Pomeroy | A47G 21/023 294/26 |
| 2,297,566 A | 9/1942 | Laux | |
| 2,490,583 A * | 12/1949 | Dunkelberger | A01K 83/00 114/303 |
| 2,604,350 A * | 7/1952 | Taylor | A47J 43/283 294/26 |
| 2,610,884 A | 9/1952 | Enderle et al. | |
| 2,623,772 A * | 12/1952 | Johnson | A01D 11/00 248/902 |
| 2,882,084 A * | 4/1959 | Eatinger | A01K 97/14 294/26 |
| 3,125,907 A * | 3/1964 | Derrickson | B60P 7/073 24/68 F |
| 3,380,092 A * | 4/1968 | Golczyuski | A43B 13/38 12/103 |
| D268,561 S * | 4/1983 | Risser | 294/26 |
| 4,574,512 A * | 3/1986 | Hahn | A01K 97/14 294/19.3 |
| 4,955,647 A * | 9/1990 | Alfredson | F24B 15/10 294/14 |
| D330,492 S * | 10/1992 | Brown | 294/26 |
| 5,382,064 A * | 1/1995 | Blais | A01M 31/00 294/169 |
| 5,575,052 A * | 11/1996 | Thoresen | B25B 33/00 29/235 |
| 5,918,535 A * | 7/1999 | Moreau | A47J 36/20 294/26 |
| 6,003,914 A * | 12/1999 | Brisbin | B25B 9/00 29/278 |
| 6,312,030 B1 * | 11/2001 | Johannes | A47J 43/18 294/26 |
| 7,395,602 B2 | 7/2008 | Backus | |
| 7,896,414 B1 * | 3/2011 | Brigham | B65G 7/12 294/25 |
| 8,162,361 B2 * | 4/2012 | Biddington | F24B 15/002 294/14 |
| 2009/0261607 A1* | 10/2009 | Braver | B65G 1/06 294/26 |
| 2010/0303602 A1* | 12/2010 | Murphy | E04H 4/1272 414/810 |
| 2010/0320784 A1* | 12/2010 | Rosenbaum | A47J 43/283 294/26 |
| 2012/0049856 A1* | 3/2012 | Chen | G01R 1/06788 324/537 |
| 2013/0104363 A1* | 5/2013 | Allen | B60N 2/2806 29/428 |

FOREIGN PATENT DOCUMENTS

| | | | | |
|---|---|---|---|---|
| FR | 2752374 A1 * | 2/1998 | .......... | B65D 83/005 |
| GB | 2201115 A * | 8/1988 | ............. | B25B 9/00 |

* cited by examiner

*Primary Examiner* — Gabriela Puig
(74) *Attorney, Agent, or Firm* — C. Nessler

(57) ABSTRACT

A puller, preferably made of bent metal wire, for removing pickles and the like from a jar in which the pickles are tightly packed is preferably made of bent wire, has a handle end, a hook end, and a shank connecting them. The hook of the puller faces in generally the same lateral direction relative to the shank axis as does the handle. And the hook has a jog, comprising two portions which are differently angled relative to the plane in which lies the handle of the puller; and outer portion angles upwardly in the shank-direction where lies the handle.

17 Claims, 2 Drawing Sheets

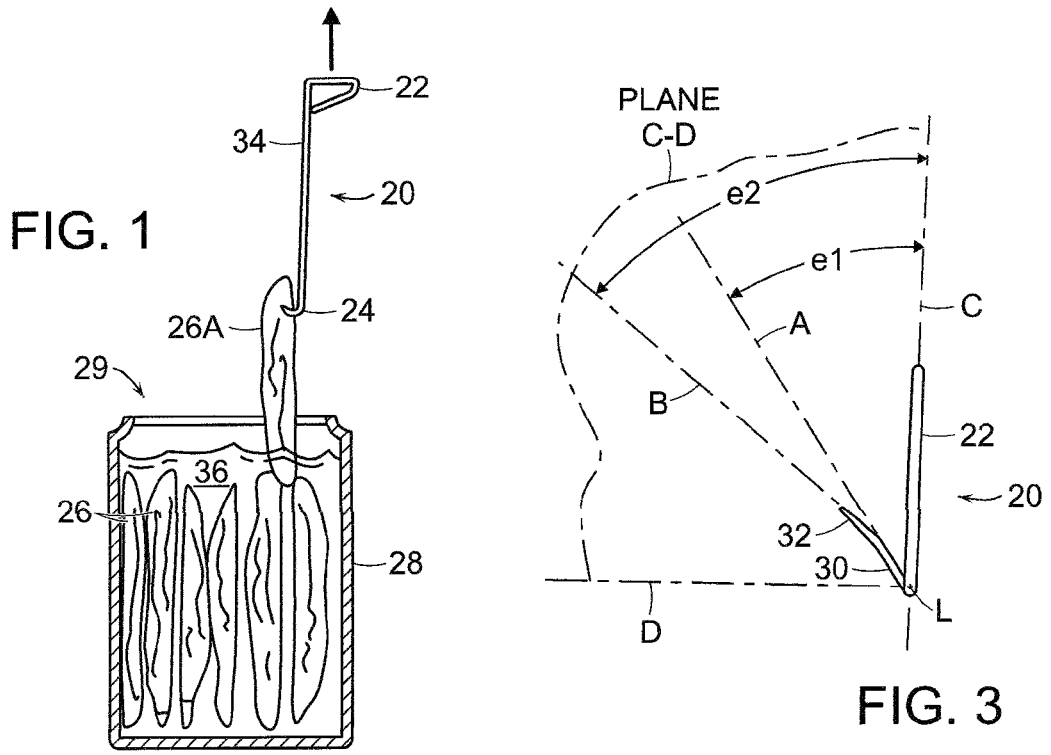
FIG. 1
FIG. 3
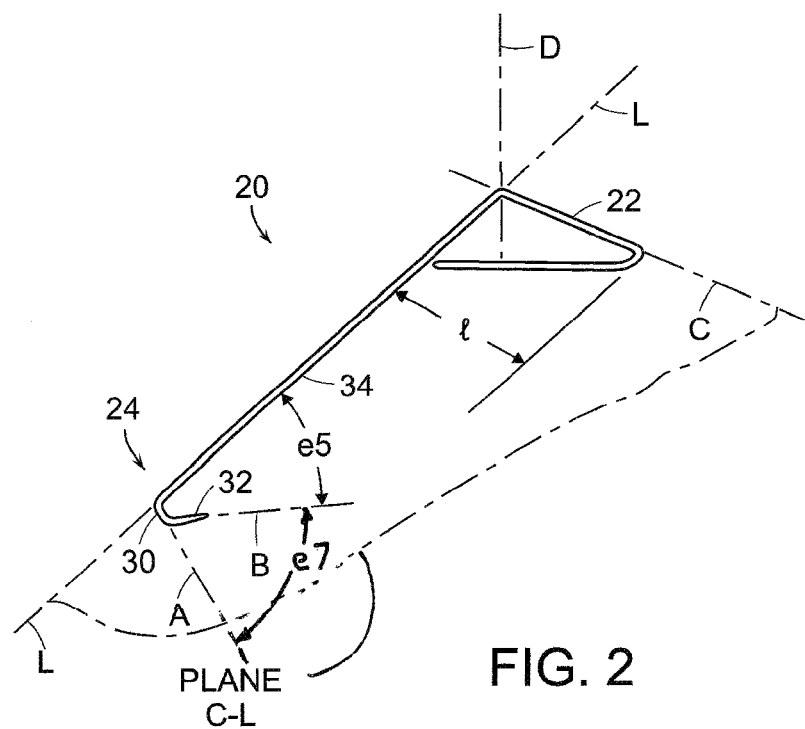
FIG. 2

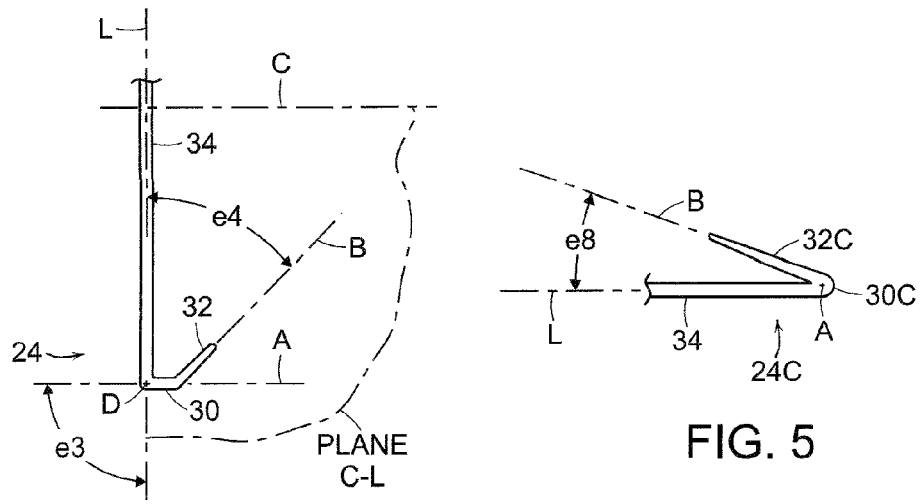
FIG. 4
FIG. 5
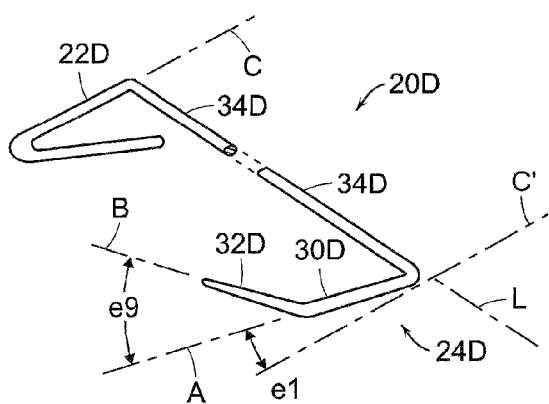
FIG. 6
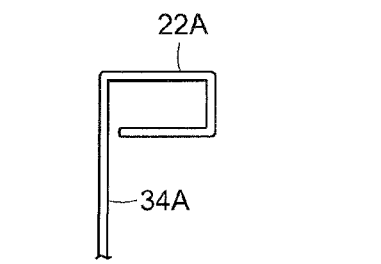
FIG. 7
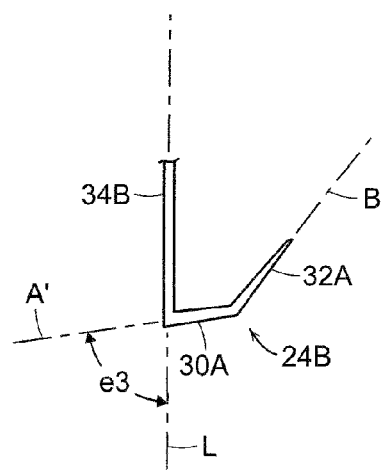
FIG. 8

KITCHEN UTENSIL FOR LIFTING FOODSTUFFS OUT OF A CONTAINER

TECHNICAL FIELD

The present invention relates to tools for handling packed foodstuffs, in particular, it relates to tools for removing a foodstuff such as closely packed pickles through the mouth of a container such as a jar.

BACKGROUND

Typically, pickled cucumbers are oblong vegetables that, for retail sale to consumers, are commonly packed in glass jars as whole pickles or as slices (in short, "pickles" hereafter). The length axes of the pickles are aligned with the length axis of the jar which has an open end covered by a removable lid. Typically, pickles are tightly packed for economy of packaging, and they are surrounded by brine.

In the past, when a typical consumer has wanted to remove a pickle from the open end of the jar lid, she has had to force either fingers or a utensil such as a knife or fork into the jar amongst the pickles, seeking to grab a pickle and pull it lengthwise from the packed mass. When the pickles are closely packed as typically is the case, it is difficult and messy to insert one's fingers or a fork or a knife or tongs into the mass of pickles, and to grasp one sufficiently to pull if from the jar. Friction amongst the close packed pickles makes it difficult to remove any of the pickles. And even when the jar has been partially emptied, stabbing a pickle with a knife or fork usually is problematic because the pickle moves away when contacted by the knife or fork, or slides off the knife or fork as the pickle is being pulled from the jar.

Consumers have coped with the foregoing task for many years. Various inventors have addressed the issue of grasping food stuffs. See for instance, U.S. Pat. No. 7,395,602 of Backus, U.S. Pat. No. 2,610,884 of Enerele et al. U.S. Pat. No. 481,691 of Currie et al., U.S. Pat. No. 880,807 of Menkin et al., U.S. Pat. No. 1,202,120 of Sutckel, and U.S. Pat. No. 1,275,504 of Unsinger. It is desirable to have a better means for removing pickles, which has attendant ease of manufacture and cleaning.

SUMMARY

An object of the invention is to provide a utensil suited for removing pickles and other closely packed foodstuffs from the open end of jars. A further object is to provide a utensil which is economic to manufacture, easy to clean, and easy to store.

In accord with the invention, an embodiment of puller for removing pickles and other foodstuffs from a container comprises a first end (proximal end), a second end (distal end) and a shank connecting the first end and second end, the shank having a length axis L. A handle is at the first end of the puller. The handle lies along an axis C which runs transverse to said axis L; and the handle lies in plane C-L which is defined by axes L and C. A hook is integral with the second distal end of the puller. The hook comprises a portion of the shank, a first inner shaft portion, which is connected to the shank portion, and a second outer shaft portion. The hook has a "jog" along its length, between the two portions; preferably there is a 30-40 degree angle between the shaft portions. The first portion is at an angle to the shank which is preferably 80-100 degrees, more preferably about 90 degrees. And relative to the plane C-L, the first portion is at a first acute angle and the second portion is at a second acute angle which is more than the first acute angle. In other words, the second portion has greater splay than does the first portion. In further accord with the invention, both hook portions have lengthwise axes which extend in a direction which is less than about 60 degrees from plane C-L, and the outer portion additionally is oriented so it extends upwardly in the direction of the handle.

In one or more preferred embodiments of a puller of the present invention, the inner portion and the outer portion of the hook each have approximately the same length; the outer portion has a pointed terminal end; the puller is made of bent metal wire having a diameter of about ⅛ inch; the handle is a bent wire loop and extends farther from the axis L than does the outer portion of the hook; and the handle is a bent loop which is generally triangular or rectangular in shape.

The two-portion jogged hook which extends obliquely to both the plane of handle and to the shank of the puller. The hook extends within about 60 degrees of the plane of the handle—which is considered here to be the same lateral direction. That enables a user to know the orientation of the hook even when it is within the pack; and the design enables the user to insert the distal end (hook end) of the puller into a mass of closely packed pickles. Further, when the puller is lifted upwardly, the outer portion of the hook first engages with the pickle; and with further upward lifting, the inner portion of the hook becomes engaged with the pickle. The more oblique orientation of the inner portion (nominally 90 degrees) is beneficial because it transmits lifting force to the pickle better than would a hook having only one oblique portion or a continuous curve (as characterizes a common fish hook)—that is, better than a hook which lacks the jog of the hook of the present invention.

The foregoing and other objects, features and advantages of the present invention will become more apparent from the following description of preferred embodiments and accompanying drawings.

BRIEF DESCRIPTION OF THE DRAWINGS

FIG. 1 shows a utensil of the present invention as it lifts a pickle from a jar filled with pickles, which jar is shown in cross section.

FIG. 2 is a perspective view of the embodiment of utensil shown in FIG. 1.

FIG. 3 is an proximal view of the utensil of FIG. 2, i.e., looking at the handle end.

FIG. 4 is detail side view of the distal or hook end of the utensil of FIG. 2.

FIG. 5 is a side view of the hook end of the puller of FIG. 2.

FIG. 6 is another perspective view of the puller of FIG. 2, showing the angles associated with the hook end.

FIG. 7 shows the rectangular wire-formed handle of an alternate embodiment puller.

FIG. 8 is a view like FIG. 4 of the hook end of an alternate embodiment puller.

DESCRIPTION

With reference to FIG. 1 and FIG. 2, utensil 20 is an embodiment of a device, often also called a puller here, which is useful for hooking into a pickle or a sliced portion of pickle 26 (collectively referred to as "pickle" hereafter), and pulling it through the open mouth 29 of jar 28. The utensil 20 is shown in FIG. 1, as it is lifting pickle 26A upwardly. In the FIG. 1 illustration the pickles 26 are shown as commonly encountered, namely lengthwise slices of dill pickles immersed in brine 36. The invention will be useful with other kinds of pickles, and with whole pickles, as well as with other vegetable and non-vegetable foodstuffs which are packed in jars tightly or in floating fashion.

Puller 20 comprises handle 22, shank 34, and hook 24, all of which portions are integral in the preferred one piece configuration of puller. Puller 20 has a particular unique shape and orientation of hook and handle, and has ease of use for both a right-handed person and a left-handed person. Puller 20 is preferably made by bending austenitic or martensitic stainless steel wire of about 0.3 cm (⅛ inch) diameter. A puller of the present invention may be made of other materials, for instance a strong plastic, or other corrosion resistant material. It is important that the outermost hook portions of a puller have a relatively small diameter of about 0.3 cm and that it be strong. It is desirable that a puller be made of smooth surfaced material for easy cleaning.

FIG. 2 is a perspective view of puller 20, showing length axis L, along which extends the shank 34. Shank 34 and handle 22 lie in a first plane C-L, which is the plane that contains both length axis L and orthogonal axis C. (In the following description and in the illustrations, an axis which is parallel to, but displaced from, the principal axis is denoted by a prime symbol, e.g. axis C' is parallel to axis C.)

Hook 24 forms the distal end of the puller, and handle 22 forms the proximal end of the puller. Hook 24 has a jog and is specially oriented; in FIG. 2 it projects downwardly from plane C-L. The orientation of hook 24 can in part be defined by its orientation to the C-L plane. FIG. 3 is a view of the proximal or handle end of the utensil, looking along the length axis L and along the C-L plane. FIG. 4 is a view along the D axis, looking down onto the C-L plane and at the hook end of the puller.

With reference to FIGS. 2, 3 and 4, the two shaft portions 30, 32 with the local portion of shank 34 form the hook 24 of puller 20. Hook 24 may be conceived as having the shape of a twisted and splayed U. The outer end of hook 24 comprises two portions of shaft, each of which has a straight axis: First (or inner) portion 30 is connected to the shank and has a lengthwise axis A. Second (or outer) portion 32, is connected to the inner portion 30, and has a lengthwise axis B. The terminal end of the outer portion 32 is preferably pointed. The portion 32 may be tapered to achieve such effect, as shown. In this description and the accompanying claim, the scope of the term "straight" will countenance some variation from perfection: An axis will be considered straight if there is a slight curve or kinking, with a variance from a straight line of 5 degrees or less. The same allowance of variability applies to the term "plane" or planar, with respect to the shape/disposition of the handle.

As shown in the Figures, there is a jog in hook 24 where the portions 30, 32 connect. The angle e7 between the axes of the inner and outer portions is 20-40 degrees, more preferably about 30 degrees. See FIG. 2. And the respective axes A and B lie, relative to plane C-L, at two different acute angles. The angle e2 of the second portion 32 is greater than the angle e1 of the first portion 30. See FIG. 3.

Consistent with the foregoing, hook 24 does not lie in one plane: Nonetheless, looking down along the length of the shank (as in FIG. 2 and FIG. 3), it can be seen that the hook extends loosely in the same lateral direction as extends the length of the handle 22. In the puller embodiment 20, both portions 30, 32 of the hook lie within an about 60 degree angle of the plane C-L of the handle. The handle extends further from the shank axis L than does the hook. Such correlation in orientation between the handle and hook gives the user of the puller a sense of the direction in which the hook extends during use, when the hook is hidden within packed pickles.

And, compared to other possible configurations of pullers, the same-direction (within-about-60 degrees) orientation of the hook and handle of a puller of the present invention also gives the user the appropriate leverage and balance which enables rotating the hook end about the axis of the shank, when doing that is desirable to enhance initial engagement of the hook with the pickle, followed by lifting of the pickle.

The angles of the two portions 30, 32 relative to each other and the other portions of the puller 20 have been experimentally determined for good function in both initially engaging a pickle and in thereafter securely removing the pickle by overcoming the frictional force of other packed-pickles. The orientation and shape of hook 24 is particularly suited for engaging a pickle—whether the user is right handed or left handed. Furthermore, the hook enables easy and quick disengagement of the puller from the pickle after the pickle has been removed from the jar, by a swift flicking of the puller by the user.

The portions 30, 32 lie at compound angles to other features of the puller. In a preferred embodiment of puller 20, the axis of the inner portion 30 runs at a 80-100 degree angle, preferably about 90 degree angle, to the axis L of the shank 34 and at an about 20-25 degrees angle to the plane C-L of the handle. As the illustrations show hook outer portion 32 extends at an angle e5 to axis L and an extension of the axis of the hook outer portion 32 does not intersect axis L. The orientations of the portions 30, 32 may be defined by stating the angles of the projections of respective axes A and B into certain orthogonal planes, as follows: FIG. 3 is an end view of the handle end of puller 20, looking and along the shank and axis L and at plane C-D. Plane C-D is defined by axis C and axis D, which axis D is perpendicular to both axis C and axis L. FIG. 4 is a view looking along the D axis (and along plane D-L at the C-L plane). With reference to FIG. 3 and FIG. 4, as well as the perspective view of FIG. 2, it will be appreciated that the axis of the inner portion 30 of the hook extends at an angle e3 to the axis L and shank, projected into the C-L plane (See FIG. 4); and at an angle e1, as projected into the plane C-D (See FIG. 3). In a preferred embodiment puller 20, angle e3 is about 85-95 degrees, more preferably 90 degrees; and angle e1 is about 30-40 degrees, more preferably about 35 degrees.

It will also be appreciated that axis B of the outer portion 32 of the hook extends at an angle e4 to the C-D plane, as the orientation of the shaft is projected into the C-L plane (See FIG. 4), and that axis B of the outer portion 32 extends at an angle e2 as projected into the plane C-L (See FIG. 3). Preferably, angle e2 is more than 45-65 degrees, more preferably about 55 degrees; and angle e4 is 40-60 degrees, preferably about 45 degrees.

Thus in a puller of the present invention, relative to the plane C-L of the handle, the outer portion 32 of the hook has greater splay than does the inner portion 30. See FIG. 3. And relative to the plane D-L the outer portion 32 of the hook has lesser splay than does the inner portion 30. See FIG. 4.

An embodiment of the invention can be also characterized as follows: The lengthwise axis of the first portion 30 of the hook is at an about 90 degree angle to the first axis L of the shank. Relative to the plane C-L, the lengthwise axis of the shaft portion 30 is at a first acute angle and the lengthwise axis of the second shaft portion 32 is at a second acute angle. The second acute angle is greater than the first acute angle; and each acute angle is less than 60 degrees. Further, the lengthwise axis B of the outer shaft portion 32 is angled relative to the axis L of the shank so the axis B extends from the terminal end of outer shaft portion in the direction of said handle. (See FIG. 4)

While an exemplary puller 20 is shown in FIG. 2 with the hook projecting downwardly from plane C-L, it will be appreciated that within the scope of the claimed invention is a puller that has in part a "mirror image", that is a puller viewed as in FIG. 2, where the hook projects upwardly from plane C-L with angles which correspond with those that are described here for puller 20.

The angles of the hook shaft portions relative to each other and to the handle enable the puller 20 to be engaged with a pickle in a jar by pushing the distal end downward into the mass of pickles, then followed by optional lateral and/or rotational hand motion relative to the plane of the handle, to cause the hook to penetrate a pickle. Then, as the puller is pulled manually upward toward the opening of the jar, the hook inner portion 30 becomes engaged with the pickle, as the hook is drawn into the pickle by the acute orientation of the outer portion 32 of the hook. The preferred about 90 degree angle of the inner portion relative to the shaft length and axis L enables better upward pulling force and positive engagement than would be achieved by a puller having a hook with a single straight acute angle portion, or by a puller having a curved hook.

The preferred smoothly tapered or pointed terminal end of outer portion 32 facilitates the engagement of the hook with a pickle. Compared to a puller which has a barb at the terminal end, the smooth pointed terminal end makes penetration of a pickle easier and enables the pickle to be easily removed from the puller after the pickle is pulled from the jar, by aforementioned "flicking."

In an exemplary puller 20, the overall length is about 18 cm, the handle extends 2 to 5 cm laterally from the axis L; the length of the hook inner portion 30 is about 1 to 1.5 cm, preferably about 1.5 cm; and the length of the hook outer portion 32 is about 1-1.5 cm, preferably about 1.5 cm. The length 1 of the handle is preferably between 2 and 4 cm.

FIG. 5 and FIG. 6 show details of further puller embodiments. FIG. 5 shows hook 24C of a puller looking along axis A of the inner portion 30C of the hook. The outer hook portion 32C is at an about 20-25 degree angle e8 to the plane A-L defined by axes A and L. FIG. 6 shows puller 20D with the middle portion of the shank 34D cut away for compactness of illustration. Axis C' is parallel to axis C of handle 22D. The inner portion 30D of hook 24D is at an angle e1 of 20-25 degrees to axis C (and thus also at angle e1 to plane C-L). The outer portion 32D of hook 24D is at an angle e9 of about 30 degrees to axis A of portion 30D.

FIG. 7 shows the proximal portion, namely handle 22A, of another puller embodiment having shank 34A. Handle 22A has a generally rectangular shape, compared to the generally triangle shape of handle 22 of puller 20. In another embodiment of the invention, not shown but readily conceived, the handle may have a curved, generally circular, shape. Puller 20 may be modified in accord with that and with FIG. 7.

FIG. 8 shows the distal portion of another embodiment puller having shank 34B and hook 24B. Hook 24B comprises inner portion 30A and outer portion 32A. The angle e3 of inner hook portion 30A is about 80 degrees when projected into the C-L plane; which compares with the about 90 degree angle of portion 30 of hook 24 of puller 20. Puller 20 may be modified accordingly within the scope of invention; angle e3 may be 80-110 degrees, more preferably about 90 degrees.

As has been expressed or can be discerned from the foregoing, when a puller of the present invention is provided, a method of using removing, through the upward facing opening of a container, a pickle or other foodstuff from a tightly packed group within the container, the user grasps the handle an inserts the hook end into the container so the hook moves downwardly amongst the packed items, or in close proximity to a separated item; then the use pulls the handle upwardly, optionally giving a twisting of the handle, so the terminal end of the outer portion of the hook engages with the item; then the user pulls upwardly, whereupon the angling of the outer portion causes the outer end to penetrate into the item, to the point that the inner portion is also drawn into engagement. The inner portion has a less acute angle and thus provides more vertical-facing bearing surface for engaging the item. The user continues to pull upwardly, and thus draws the item from the container and through the opening.

The invention, with explicit and implicit variations and advantages, has been described and illustrated with respect to several embodiments. Those embodiments should be considered illustrative and not restrictive. Any use of words which relate to the orientation of an article pictured in space are for facilitating comprehension and should not be limiting should an article be oriented differently. Any use of words such as "preferred" and variations thereof suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A puller for removing foodstuffs from an upward facing opening of a container, comprising:
   a shank having a first end and a second end, the shank lying along a lengthwise first axis (L);
   a handle integrally connected to and extending laterally from the first end of the shank, the handle lying along a second axis (C) which runs transverse to said lengthwise first axis (L) of the shank and in a first plane (C-L) defined by said first axis and said second axis;
   a hook integral with the second end of the shank, the hook comprising a portion of said shank, an inner shaft portion having an lengthwise axis (A), connected to the shank, and an outer shaft portion connected to the inner shaft portion, the outer shaft portion having a lengthwise axis (B) and a terminal end; wherein said inner shaft portion and said outer shaft portion both lie within 60 degrees of the direction in which the handle extends from said lengthwise first axis (L);
   wherein said lengthwise axis (A) of said inner shaft portion of the hook is at an angle of 80 to 100 degrees to said lengthwise first axis (L) of the shank and at an angle (e1) of 30 to 40 degrees to said first plane (C-L); and,
   wherein said lengthwise axis (B) of said outer shaft portion of the hook is at an angle of 20 to 40 degrees to said lengthwise axis (A) of said inner shaft portion.

2. The puller of claim 1 wherein the angle between said lengthwise axis (A) of the inner shaft portion and said lengthwise first axis (L) of the shank is about 90 degrees.

3. The puller of claim 1 wherein said outer shaft portion is tapered or has a pointed terminal end.

4. The puller of claim 1 wherein said inner shaft portion and said outer shaft portion each have approximately the same length.

5. The puller of claim 1 wherein the handle extends farther from the lengthwise first axis (L) than does the terminal end of said outer portion of the hook.

6. The puller of claim 1 made of metal wire, wherein the handle is formed of a bent loop.

7. The puller of claim 6 wherein the bent loop is generally triangular or rectangular.

8. The puller of claim 1 made of metal wire having a diameter of about 1/8 inch.

9. A puller for removing one or more pieces of foodstuffs from a container having an upward facing opening, comprising:
- a shank having a first end and a second end, the shank lying along a lengthwise first axis (L);
- a handle integrally connected to and extending laterally from the first end of the shank, the handle lying along a second axis (C) which runs transverse to said lengthwise first axis (L) of the shank and lying in a first plane (C-L) defined by said first axis and said second axis;
- a hook integral with the second end of the shank, the hook comprising a portion of said shank, an inner shaft portion having an lengthwise axis (A), connected to the shank, and an outer shaft portion connected to the inner shaft portion, the outer shaft portion having a lengthwise axis (B) and a terminal end; wherein said inner shaft portion and said outer shaft portion both lie within 60 degrees of the direction in which the handle extends from said lengthwise first axis (L);
- wherein said lengthwise axis (A) of the inner shaft portion is at a 80 to 100 degree angle to the lengthwise first axis (L) of the shank and at a first angle to the first plane (C-L); and,
- wherein said lengthwise axis (B) of the outer shaft portion lies at a second angle to the first plane (C-L), which second angle is greater than said first angle.

10. The puller of claim 9 wherein the angle between said lengthwise axis (A) of said inner shaft portion and said lengthwise first axis (L) of the shank is about 90 degrees.

11. The puller of claim 9 made of metal wire having a diameter of about 1/8 inch.

12. The puller of claim 9 wherein the outer portion is tapered or has a pointed terminal end.

13. The puller of claim 9 wherein the inner shaft portion of the hook and the outer shaft portion of the hook each have approximately the same length.

14. The puller of claim 9 wherein the handle extends farther from the lengthwise first axis (L) than does the terminal end of said outer shaft portion of the hook.

15. The puller of claim 9 made of metal wire, wherein the handle is formed of a bent loop.

16. The puller of claim 15 wherein the bent loop is generally triangular or rectangular.

17. A method of removing, through the upward facing opening of a container, a pickle or other foodstuff from a tightly packed group of said pickles or other foodstuffs within said container, which comprises:

(a) providing a puller which comprises:
- a shank having a first end and a second end, the shank lying along a lengthwise first axis (L);
- a handle integrally connected to the first end of the shank, the handle lying along an axis (C) which runs transverse to said lengthwise first axis (L) of the shank, the handle also lying in a first plane (C-L) defined by said lengthwise first axis (L) of the shank and said transverse axis (C) of the handle;
- a hook integral with the shank at said second end, the hook comprising a portion of the shank second end, a first shaft portion integral with and extending from the second end of the shank, and a second shaft portion integral with the first shaft portion and extending from the first shaft portion to a terminal end, each shaft portion having a respective lengthwise axis;
  - wherein, the lengthwise axis of the first portion is at an about 90 degree angle to said shank lengthwise first axis (L), and wherein relative to said first plane (C-L), the lengthwise axis of the first shaft portion is at a first acute angle and the lengthwise axis of the second shaft portion is at a second acute angle; wherein the second acute angle is greater than the first acute angle; wherein each acute angle is less than 60 degrees; and wherein the lengthwise axis of the outer shaft portion is angled relative to the lengthwise first axis (L) of the shank so said lengthwise axis extends from the terminal end of outer shaft portion relative to the shank lengthwise first axis (L) in the direction of said handle;
(b) grasping the handle of the puller and inserting said hook and puller second end including said hook into the opening of the container, so that the hook moves downwardly amongst the closely packed group of pickles or other foodstuffs;
(c) then pulling the handle upwardly to engage the terminal end and outer shaft portion of the puller with one of said pickles or other foodstuffs;
(d) then continuing to pull upwardly on the handle of the puller to cause the outer shaft portion to be drawn into said one due to the angle-orientations of the outer shaft portion relative to the shank; and,
(e) further continuing to pull upwardly on the handle of the puller to draw said one from said closely packed group and through the opening of the container by means of engagement of both the inner shaft portion and the outer shaft portion with said one.

* * * * *